United States Patent
Pan et al.

(10) Patent No.: US 10,922,527 B2
(45) Date of Patent: Feb. 16, 2021

(54) FACE SPATIAL POSITIONING METHOD, FACE SPATIAL POSITIONING SYSTEM, AND NON-TRANSITORY COMPUTER-READABLE RECORDING MEDIUM

(71) Applicant: BEIJING KUANGSHI TECHNOLOGY CO., LTD., Beijing (CN)

(72) Inventors: Yuchao Pan, Beijing (CN); Shuchang Zhou, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 92 days.

(21) Appl. No.: 16/175,350

(22) Filed: Oct. 30, 2018

(65) Prior Publication Data

US 2019/0213392 A1    Jul. 11, 2019

(30) Foreign Application Priority Data

Jan. 11, 2018 (CN) .......................... 201810027958.8

(51) Int. Cl.
G06K 9/00    (2006.01)

(52) U.S. Cl.
CPC ..... *G06K 9/00228* (2013.01); *G06K 9/00771* (2013.01)

(58) Field of Classification Search
CPC .............................. G06K 9/00228; G06K 9/00
See application file for complete search history.

(56) References Cited

U.S. PATENT DOCUMENTS

2017/0345183 A1* 11/2017 Chen ..................... G06T 7/74

FOREIGN PATENT DOCUMENTS

| CN | 102262483 | 11/2011 |
| CN | 104197901 | 12/2014 |
| CN | 106303565 | 1/2017 |

OTHER PUBLICATIONS

First Chinese Office Action, issued in the corresponding Chinese patent application No. 201810027958.8, dated Apr. 3, 2020, 13 pages.
"EVFaceTracker", Evermeer, Jul. 9, 2012, 18 pages, availavle at: https://github.com/evermeer/EVFaceTracker/commit/cd697f445f67dc0ed6ea9a86c9le15d45d52badc.

(Continued)

*Primary Examiner* — Ruiping Li
(74) *Attorney, Agent, or Firm* — Hamre, Schumann, Mueller & Larson, P.C.

(57) ABSTRACT

The embodiments of this disclosure provide a face spatial positioning method, apparatus and system, and a non-transitory recording medium. The method includes: obtaining a facial image acquired by an image acquisition device; performing facial area detection on the facial image, to determine position information of a facial area in the facial image; and determining spatial position information of the face according to the position information of the facial area. Accordingly, the embodiments of this disclosure can determine spatial position information of the face according to the facial image acquired by only one image acquisition device, no additional image acquisition device is needed, which can reduce the cost and ensure the processing efficiency.

12 Claims, 5 Drawing Sheets

(56) References Cited

OTHER PUBLICATIONS

Fan Wenping, "Research on master-slave Camera linkage Algorithm based on Face feature point location", China Excellent Master Dissertation Full-text Database Information Technology Series, 4th issue, Apr. 15, 2015, 89 pages.
Second Chinese Office Action, issued in the corresponding Chinese patent application No. 201810027958.8, dated Dec. 2, 2020.

* cited by examiner

FACE SPATIAL POSITIONING METHOD, FACE SPATIAL POSITIONING SYSTEM, AND NON-TRANSITORY COMPUTER-READABLE RECORDING MEDIUM

CROSS-REFERENCE TO RELATED APPLICATION

The present application claims the priority of Chinese patent application No. 201810027958.8 filed on Jan. 11, 2018, the disclosure of which is incorporated herein by reference in its entirety.

TECHNICAL FIELD

The present disclosure relates to the field of image processing, and more particularly, to a face spatial positioning method, a face spatial positioning system, and a non-transitory computer-readable recording medium.

BACKGROUND

Facial detection and the like have been greatly applied in various fields of life, and have become standard technologies in the field of computer vision. As one of the applications, position of the face in the space can be determined based on a result of facial detection, however, due to the monocular characteristic, at least two image acquisition devices are required in determining position of the face in the space, which not only adds extra hardware cost, but also causes low processing efficiency because it needs to process data acquired by at least two image acquisition devices.

SUMMARY

The present disclosure is proposed in view of the above problem. The present disclosure provides a face spatial positioning method, apparatus and system, and a computer storage medium, spatial position information of the face can be determined according to the facial image acquired by an image acquisition device, no additional image acquisition device is needed, which can reduce the cost and ensure the processing efficiency.

According to an aspect of the present disclosure, there is provided a face spatial positioning method, the method comprising:

obtaining a facial image acquired by an image acquisition device;

performing facial area detection on the facial image, to determine position information of a facial area in the facial image; and determining spatial position information of the face according to the position information of the facial area.

According to another aspect of the present disclosure, there is provided a face spatial positioning apparatus, the apparatus is for carrying out steps of the method according to the aspects described above or the respective embodiments, the apparatus comprising:

an obtaining module configured to obtain a facial image acquired by an image acquisition device;

a first determining module configured to perform facial area detection on the facial image, to determine position information of a facial area in the facial image; and a second determining module configured to determine spatial position information of the face according to the position information of the facial area.

According to yet another aspect of the present disclosure, there is provided a face spatial positioning system, comprising a memory, a processor, and a computer program stored on the processor and running on the processor, wherein steps of the method according to the aspects described above or the respective examples are carried out when the processor executes the computer program.

According to still yet another aspect of the present disclosure, there is provided a computer storage medium on which a computer program is stored, wherein steps of the method according to the aspects described above or the respective examples are carried out when the computer program is executed by a processor.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, these described embodiments merely are only part of the embodiments of the present disclosure, rather than all of the embodiments of the present disclosure, it should be understood that, the present disclosure is not limited to the exemplary embodiments described herein. All other embodiments obtained by a person skilled in the art based on the embodiments described in the present disclosure without paying inventive efforts should all fall into the protection scope of the present disclosure.

Figure 1:
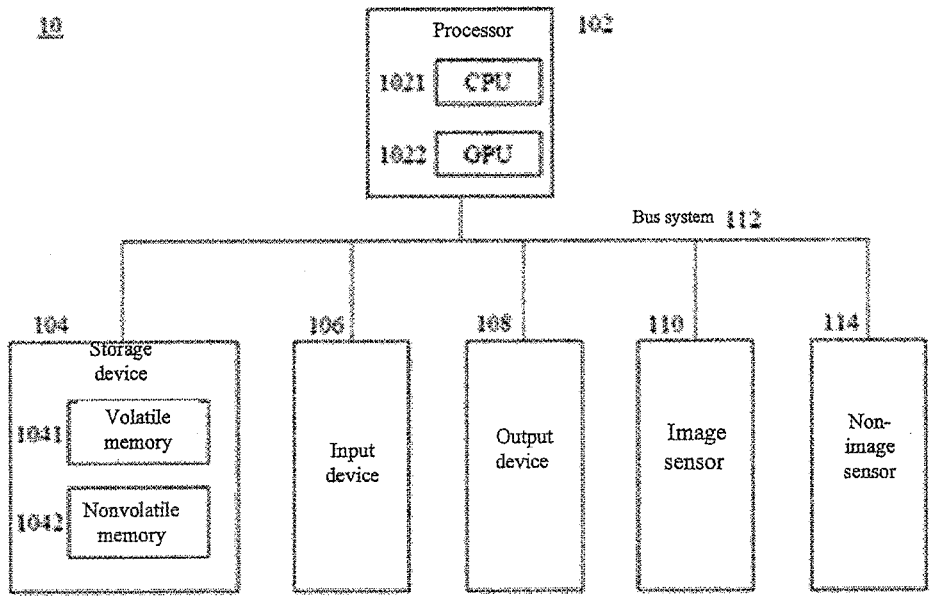
FIG. 1 is a schematic block diagram of an electronic device according to an embodiment of the present disclosure.

The embodiments of the present disclosure may be applied to an electronic device. FIG. 1 shows a schematic block diagram of an electronic device according to an embodiment of the present disclosure. The electronic device 10 shown in FIG. 1 comprises one or more processors 102, one or more storage devices 104, an input device 106, an output device 108, an image sensor 110 and one or more non-image sensors 114, these components are interconnected through a bus system 112 and/or other forms. It should be noted that, components and structures of the electronic device 10 shown in FIG. 1 are merely exemplary, not restrictive, and the electronic device may have other components and structures as needed.

The processor 102 may include a central processing unit (CPU) 1021 and a graphics processing unit (GPU) 1022 or other forms of processing unit with data processing capability and/or instruction execution capability, such as Field-Programmable Gate Array (FPGA) or Advanced RISC (Reduced Instruction Set Computer) Machine (ARM), and the processor 102 can control other components in the electronic device 10 to perform desired functions.

The storage device 104 may include one or more computer program products, said computer program products may include various forms of computer-readable storage medium, such as a volatile memory 1041 and/or a nonvolatile memory 1042. The volatile memory 1041 may include, for example, a random access memory (RAM) and/or a cache or the like. The nonvolatile memory 1042 may include, for example, a read only memory (ROM), a hard disk, a flash memory or the like. One or more computer program instructions may be stored on the computer-readable storage medium, and the processor 102 may execute the program instructions to implement various desired functions. Various application programs and various data may also be stored in the computer-readable storage medium, such as various data used and/or generated by the application programs or the like.

The input device 106 may be a device used by a user to input an instruction, and may include one or more of a keyboard, a mouse, a microphone, a touch screen or the like.

The output device 108 may output various types of information (e.g., image or sound) to the outside (e.g., a user), and may include one or more of a display, a speaker or the like.

The image sensor 110 may capture images (e.g., photos, videos, etc.) desired by the user and store the captured images in the storage device 104 for use by other components.

It should be noted that, the components and structures of the electronic device 10 illustrated in FIG. 1 are merely exemplary, although the electronic device 10 illustrated in FIG. 1 includes a plurality of different devices, some of them may not be necessary as desired, wherein the number of some devices may be more, etc., and the present disclosure is not limited thereto.

Figure 2:
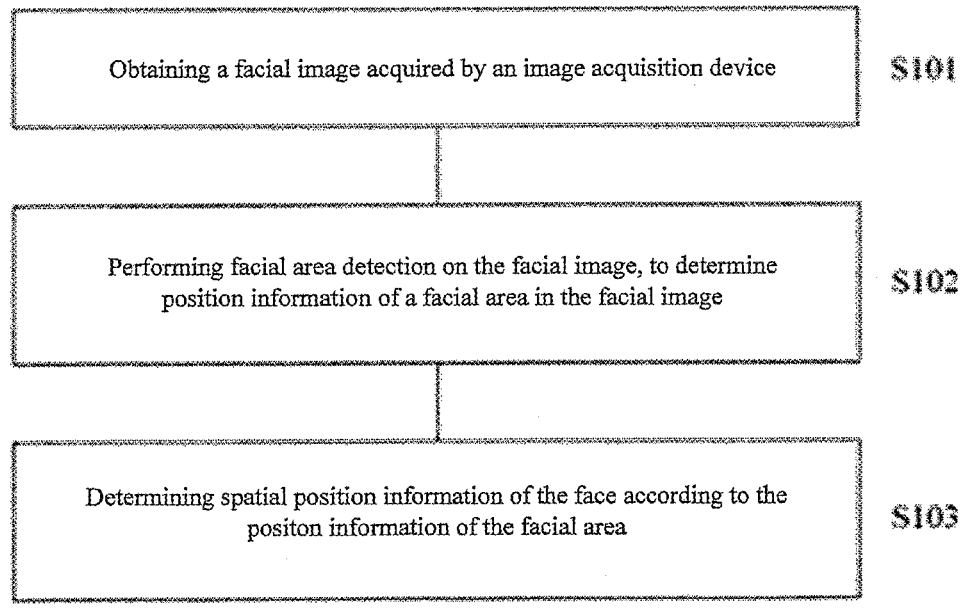
FIG. 2 is a schematic flowchart of a face spatial positioning method according to an embodiment of the present disclosure.

FIG. 2 is a schematic flowchart of a face spatial positioning method according to an embodiment of the present disclosure, the method shown in FIG. 2 comprises:

S101, obtaining a facial image acquired by an image acquisition device;

S102, performing facial area detection on the facial image, to determine position information of a facial area in the facial image; and S103, determining spatial position information of the face according to the position information of the facial area.

Exemplarily, the facial image in S101 may be acquired in real time by the image acquisition device. Optionally, the facial image may be one frame of image in real-time video acquired by the image acquisition device. The image acquisition device may be a camera or the like.

Exemplarily, S102 may comprise inputting a facial image to a facial detection model to obtain an output. This output is position information of the facial area. The facial detection model may be a Convolutional Neural Network (CNN).

The output of the facial detection model may be coordinates of a facial rectangle box, that is, the area where the face is located is a rectangular area. Correspondingly, face coordinates of the rectangular area in the coordinate system of the facial image may be determined in S102.

For example, the output may include four values. As an example, the four values represent coordinates of the upper left corner and the lower right corner of the rectangular box; as another example, the four values represent coordinates of the lower left corner and the upper right corner of the rectangular box; as another example, the four values represent coordinates of any vertex (such as the top left corner or bottom left corner) of the rectangular box and a length and a width of the rectangle box.

Figure 3:
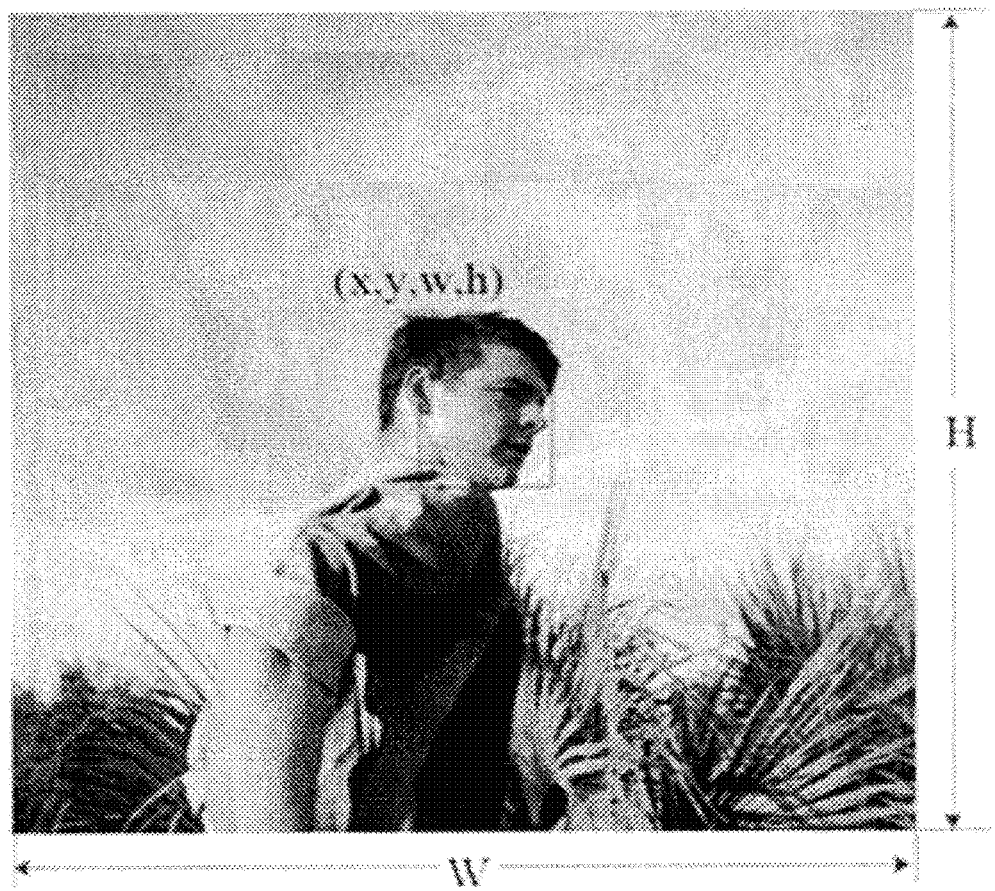
FIG. 3 is a schematic diagram of a rectangular box in which a face is located according to an embodiment of the present disclosure.

As an example, the output may be represented as (x, y, w, h), wherein (x, y) may represent coordinates of the upper left corner of the rectangular box; w and h represents a width and a height of the rectangular box, as shown in FIG. 3. In addition, referring to FIG. 3, the width and the height of the facial image may be represented as W and H.

Exemplarily, spatial position information of the face may include a distance and an angle between the face and the image acquisition device. S103 may comprise: determining a distance and an angle between the face and the image acquisition device according to the position information of the facial area.

Specifically, in consideration of that the distance between the face and the image acquisition device is inversely proportional to a size of the detected rectangular box of the face, that is, the greater the distance between the face and the image acquisition device is, the smaller the detected rectangle box is, the distance and angle between the face and the image acquisition device may be determined according to the following formula.

First, a dimension of the facial area (i.e., the rectangular box) determined in the facial image may be calculated as s=w×h. Further, it may be determined that the distance between the face and the image acquisition device is r=min (T/s,r0), that is, $$r = \min\left(\frac{T}{w \times h}, r0\right).$$

Herein, r0 indicates the longest distance within which the image acquisition device performs facial recognition, and T indicates an inverse proportional coefficient. Specifically, r0 represents a maximum distance between all points on a radar map of the image acquisition device and the origin on the radar map, that is, if the distance between a point on the radar map and the origin is greater than or equal to the distance between any other point on the radar map and the origin, then the distance between this point and the origin is the farthest distance, it may be set according to performance of the image acquisition device and scene requirements, so that r is calculated by taking a minimum value, those exceeding r0 may be all set as r0 T is an inverse proportional coefficient, it may be set according to a size of the face box at the longest distance r0. For example, it is assumed that the size of the detected rectangular box of the face is s0 if there is a distance r0 from the image acquisition device, it can be determined that T=r0×s0.

Next, coordinate of the center point of the rectangular box in the horizontal direction may be calculated as $x_c=x+w/2$, and further, the angle between the face and the image acquisition device may be determined as $\alpha=(1-x_c/W)\times\pi$, that is, $$\alpha = \left(1 - \frac{x+w/2}{W}\right)\times\pi.$$

As will be appreciated, the range of $\alpha$ is $[0,\pi]$.

Accordingly, the spatial position information of the face in the facial image can be obtained by the method described in FIG. 2. The position may be a relative position between the face and the image acquisition device, expressed in the form of polar coordinates $(r,\alpha)$. As will be appreciated, the position may also be expressed as a form of $(r\times\cos\alpha, r\times\sin\alpha)$ in the Cartesian coordinate system.

Figure 4:
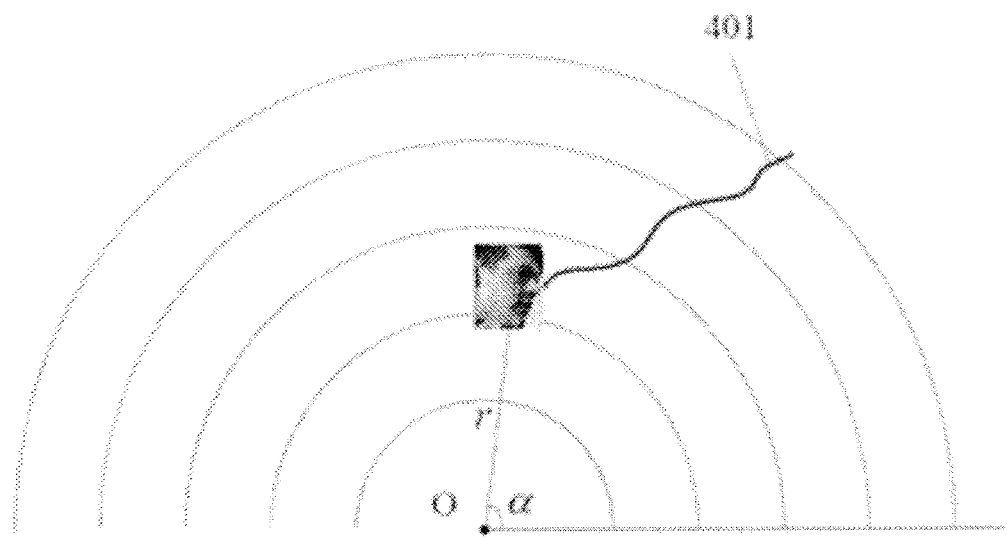
FIG. 4 is a schematic diagram of a radar map display of an embodiment of the present disclosure.

Exemplarily, position of the face may be marked in the radar map of the image acquisition device, as shown in FIG. 4. The point O may represent the position of the image acquisition device, and the distance between the face and the point O shown in FIG. 4 is the distance r between the face and the image acquisition device as described above, and the angle $\alpha$ between the line connecting the face shown in FIG. 4 and the point O and the horizontal direction is the angle between the face and the image acquisition device as described above. In this way, the relative position between the face and the image acquisition device, such as the distance and the angle, can be determined based on the spatial position information of the face obtained in S103. In this way, positioning of a person can be achieved. Further, the specific position of the face in the three-dimensional real space can be determined in combination with information such as a person's posture (sitting posture, standing posture, bending, etc.) and height.

As an implementation manner, if the facial image in S101 is one frame of image in a video stream, and only one face is included in the facial image, then, the method shown in FIG. 2 is executed on each frame of image in the video stream acquired by the image acquisition device, and the spatial position information of the face in the video stream at each frame can be determined, so that a spatial motion trajectory of the face (or simply referred to as a motion trajectory) can be determined.

Exemplarily, considering N frames of images in the video stream, spatial position information of the face in each frame of the image can be determined, and a link line of these positions in a chronological order may represent the motion trajectory. One possible motion trajectory 401 is shown in FIG. 4.

Similarly, as will be appreciated, if at least two faces are included in the facial image acquired by the image acquisition device in S101, the spatial position information of each face may be separately determined by referring to the above description. For example, it is assumed that the facial image in S101 includes two faces, and the rectangular areas determined in S102 are represented as (x1, y1, w1, h1) and (x2, y2, w2, h2), respectively, the spatial position information of the corresponding faces may be determined as (r1, $\alpha$1) and (r2, $\alpha$2) respectively in S103.

As another implementation manner, if the facial image in S101 is one frame of image in a video stream, and the facial image includes at least two faces, then the motion trajectory of each face can be determined separately.

Specifically, one face A among them is taken as an example for discussion. It is assumed that the rectangular box in which the face resides in the t-th frame is represented as $(x_t,y_t,w_t,h_t)$, and its spatial position information is $(r_t,\alpha_t)$. For multiple faces in the (t+1)-th frame of image, it is first determined which one of multiple faces belongs to the same person as the face A.

Optionally, rectangular boxes where multiple faces in the (t+1)-th frame of image reside separately may be determined, first it is determined whether the face represented by the rectangular box which is closest to $(x_t,y_t,w_t,h_t)$ belongs to the same person as the face A; if it is determined that they do not belong to the same person after judgment, it is further determined whether the face represented by the rectangular box which is next closet belongs to the same person as the face A, . . . until a rectangular box belonging to the same person as the face A is found. Further, the spatial position information $(r_{t+1},\alpha_{t+1})$ of the face A at the (t+1)-th frame may be determined according to a rectangular box (assumed to be $(x_{t+1},y_{t+1},w_{t+1},h_{t+1})$) that belongs to the same person as the face A found in the (t+1)-th frame image.

In this way, it is possible to similarly determine which face in the next frame of image belongs to the same person based on the face in each frame of image, and finally determine the motion trajectory of the face.

Herein, when judging whether it belongs to the same person, a face recognition model may be used. Exemplarily, if it is determined whether the face A and the face B belong to the same person, a first feature vector of the face A may be determined, and a second feature vector of the face B may be determined. A distance between the first feature vector and the second feature vector is calculated to obtain a similarity between the face A and the face B. If the calculated similarity is greater than a predefined threshold, the face A and the face B are considered as belonging to the same person. The predefined threshold may be set according to scene requirements and the like.

Exemplarily, a step length for a definite position may be set, and positions in the corresponding frames may be determined with this step length as an interval. Optionally, the motion trajectory within a period of time length may be further determined.

For example, it is assumed that the step length is p frames. For the t-th frame to the (t+N)-th frame, the spatial position information $(r_t,\alpha_t)$ of the face at the t-th frame may be determined; the spatial position information $(r_{t+p},\alpha_{t+p})$ of the face at the (t+p)-th frame is determined; and the spatial position information $(r_{t+2p},\alpha_{t+2p})$ of the face at the (t+2p)-th frame is determined, and so on, and so forth. In this way, the motion trajectory of the face during the t-th frame to the (t+N)-th frame can be determined according to $\lfloor N/p \rfloor$ positions, and specifically, the spatial trajectory can be obtained by sequentially linking the spatial position information according to a chronological order. This process can greatly reduce the amount of calculation, specifically, reducing the amount of calculation to 1/p, which reduces hardware requirements, and improves calculation efficiency.

Accordingly, the embodiments of the present disclosure can determine spatial position information of the face according to the facial image acquired by only one image acquisition device, and no additional image acquisition device is needed, which can reduce the cost and ensure the processing efficiency. Furthermore, a motion trajectory of the face can be determined based on the spatial position information of the face.

It can be understood that, further, the motion trajectory may be analyzed to determine whether abnormal or dangerous behaviors can be analyzed out, such as pedestrians staying in a passage for a long time, and retrograding in the flow of people. Further, according to an analysis result of the motion trajectory, corresponding prompts or alarms or the like can be made.

Figure 5:
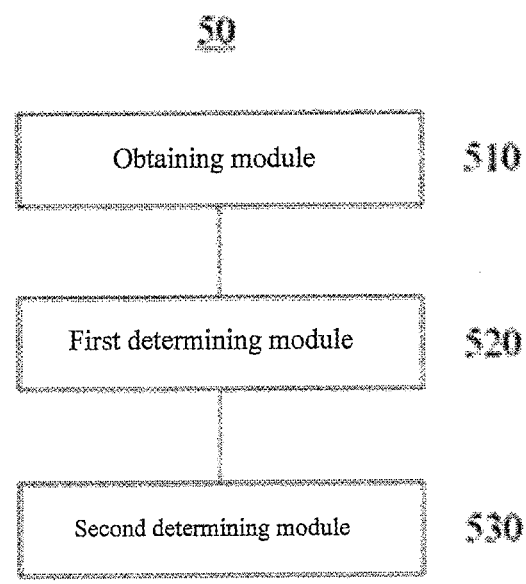
FIG. 5 is a schematic block diagram of a face spatial positioning apparatus according to an embodiment of the present disclosure.

FIG. 5 is a schematic block diagram of a face spatial positioning apparatus according to an embodiment of the present disclosure. The apparatus 50 in FIG. 5 comprises: an obtaining module 510, a first determining module 520 and a second determining module 530.

The obtaining module 510 is configured to obtain a facial image acquired by an image acquisition device.

The first determining module 520 is configured to perform facial area detection on the facial image, to determine position information of a facial area in the facial image, The second determining module 530 is configured to determine spatial position information of the face according to the position information of the facial area.

Exemplarily, the facial area is a rectangular area, and the position information of the facial area includes a vertex coordinate of the rectangular area and a width and a height of the rectangular area.

Exemplarily, the second determining module 530 may be specifically configured to determine a distance and an angle between the face and the image acquisition device according to the position information of the facial area.

Exemplarily, the second determining module 530 may be specifically configured to determine a distance between the face and the image acquisition device as:

$$r = \min\left(\frac{T}{w \times h}, r0\right);$$

determine an angle between the face and the image acquisition device as:

$$\alpha = \left(1 - \frac{x + w/2}{W}\right) \times \pi;$$

where w and h indicate a width and a height of the rectangular area respectively, W indicates a width of the facial image, x indicates an abscissa of the lower left corner or the upper left corner of the rectangular area, r0 indicates the longest distance within which the image acquisition device performs facial recognition, and T indicates an inverse proportional coefficient.

Optionally, T=r0×s0, where s0 indicates a size of a facial rectangle box when the image acquisition device detects a face at a distance r0.

Optionally, the second determining unit 520 is further configured to: determine multiple pieces of corresponding spatial position information of the face according to multiple frames of facial image acquired by the image acquisition device; and link the multiple pieces of spatial position information according to a chronological order to obtain a spatial motion trajectory of the face.

The apparatus 50 shown in FIG. 5 can implement the face spatial positioning method shown in FIGS. 2 to 4, in order to avoid repetition, no more details are repeated herein.

Figure 6:
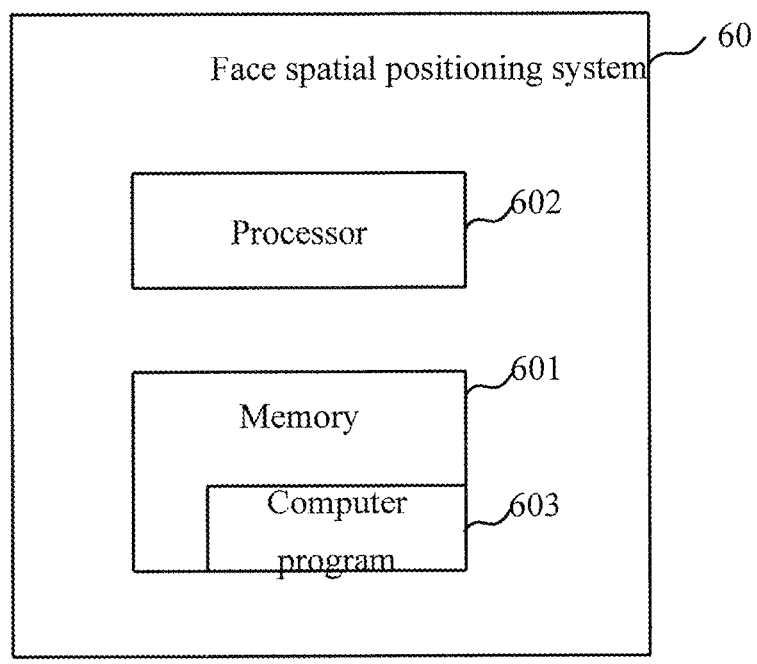
FIG. 6 is a schematic diagram of a face spatial positioning system according to an embodiment of the present disclosure.

FIG. 6 is a schematic diagram of a face spatial positioning system according to an embodiment of the present disclosure. As shown in FIG. 6, the face spatial positioning system 60 according to an embodiment of the present disclosure comprises a memory 601, a processor 602, and a computer program 603 stored on the memory 601 and running on the processor 602. Steps of the face spatial positioning method illustrated in FIGS. 2 to 4 are carried out when the computer program is executed by the processor 602.

Figure 7:
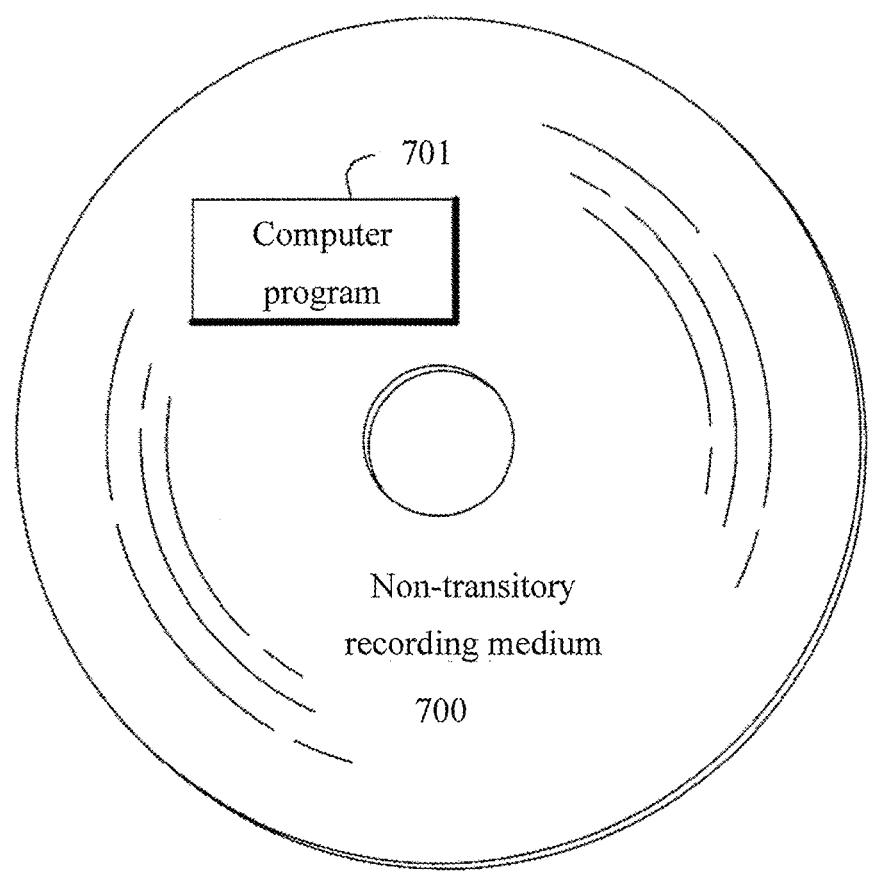
FIG. 7 is a schematic diagram of a non-transitory recording medium according to an embodiment of the present disclosure.

FIG. 7 shows a schematic diagram of a non-transitory storage medium according to an embodiment of the present disclosure. As shown in FIG. 7, the non-transitory storage medium 700 according to an embodiment of the present disclosure stores a computer program 701, steps of the face spatial positioning method illustrated in FIGS. 2 to 4 are carried out when the computer program 701 is executed by a computer.

In addition, an embodiment of the present disclosure further provides an electronic device, the electronic device may comprise the apparatus 50 as shown in FIG. 5. The face spatial positioning method shown in FIGS. 2 to 4 may be achieved by the electronic device.

The embodiments of the present disclosure provide a face spatial positioning method, apparatus and system, an electronic device and a computer storage medium, spatial position information of the face can be determined according to the facial image acquired by only one image acquisition device, and no additional image acquisition device is needed, which can reduce the cost and ensure the processing efficiency. Furthermore, a motion trajectory of the face can be determined based on the spatial position information of the face. Subsequently, the motion trajectory may be analyzed to determine whether abnormal or dangerous behaviors can be analyzed out, such as pedestrians staying in a passage for a long time, and retrograding in the flow of people.

Although exemplary embodiments of the present disclosure have been described with reference to the drawings, it should be understood that, these exemplary embodiments are merely illustrative, not intended to limit the scope of the present disclosure thereto. A person of ordinary skill in the art may make various changes and modifications, thereto, without departing from the scope and spirit of the present disclosure. All of these changes and modifications are intended to be included in the scope of the present disclosure as required based on the claims attached thereto.

A person of ordinary skill in the art may be aware that, units and algorithm steps described as examples in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another apparatus, or some features may be ignored or not performed.

The description provided here has illustrated a lot of specific details. However, it should be understood that, the embodiments of the present disclosure can be practiced without these specific details. In some embodiments, the well-known methods, structures and techniques are not illustrated in detail, so that the description will not be obscure to be understood.

Similarly, it should be understood that, in order to simplify the present disclosure and help to understand one or more of various aspects of the present disclosure, the various features of the present disclosure, in the aforesaid description of illustrative embodiments of the present disclosure, are sometimes grouped into a single embodiment, drawing, or description thereof. However, the disclosed method should not be explained as reflecting the following intention: i.e. the invention sought for protection claims more features than the features clearly defined in any claim. To put more precisely, as is reflected in the following claims, the inventive point contains less features than all the features of a single embodiment disclosed hereinbefore. Therefore, the claims complying with a specific embodiment are explicitly incorporated into the specific embodiment, wherein every claim itself acts as an individual embodiment of the present disclosure.

A person skilled in the art can understand that, except that at least some of these features and/or process or units are exclusive to each other, any combinations can be adopted to combine all the features disclosed by the description (including the attached claims, abstract and drawings) and any method or all process of the device or unit disclosed as such. Unless there is explicit statement, every feature disclosed by the present description (including the attached claims, abstract and drawings) can be replaced by substitute feature providing the same, equivalent or similar purpose.

In addition, a person skilled in the art can understand that, although some embodiments described here comprise some features instead of other features included in other embodiments, the combination of features of different embodiments are deemed as falling into the scope of the present disclosure and forming different embodiments. For example, in the claims, any one of the embodiments sought for protection can be used in various combination modes.

The various components embodiments of the present disclosure can be realized by hardware, or realized by software modules running on one or more processors, or realized by combination thereof. A person skilled in the art should understand that, microprocessor or digital signal processor (DSP) can be used for realizing some or all functions of some or all components of the devices for presenting relevant information of accessed website according to the embodiments in the present disclosure in practice. The present disclosure can also realize one part of or all devices or programs (for example, computer programs and computer program products) used for carrying out the method described here. Such programs for realizing the present disclosure can be stored in computer-readable medium, or can possess one or more forms of signal. Such signals can be downloaded from the Internet website or be provided at signal carriers, or be provided in any other forms.

It should be noticed that, the forgoing embodiments are intended to illustrate the present disclosure and are not for limiting the present disclosure, and a person skilled in the art can design substitute embodiments without departing from the scope of the appended claims. In the claims, any reference marks between brackets should not be construed as limit for the claims. The word "comprise" does not exclude elements or steps that are not listed in the claims. The word "a" or "one" before the elements does not exclude the existence of a plurality of such elements. The present disclosure can be realized by means of hardware comprising several different elements and by means of properly programmed computer. In the unit claims listing several devices, several of the devices can be embodied by a same hardware item. The use of words "first", "second" and "third" does not mean any sequence. These words can be explained as name.

The above is only the specific implementations of the present disclosure or the description of the specific embodiments, and the scope of the present disclosure is not limited thereto, and all changes or substitutions that can be easily conceived of by a person skilled in the art should be included within the technical scope of the present disclosure. The scope of the present disclosure should be determined by the scope of the claims.

What is claimed is:

1. A face spatial positioning method, comprising:
    obtaining a facial image acquired by an image acquisition device;
    performing facial area detection on the facial image, to determine position information of a facial area in the facial image; and
    determining spatial position information of a face according to the position information of the facial area,
    wherein determining spatial position information of the face according to the position information of the facial area comprises:
    determining a distance and an angle between the face and the image acquisition device according to the position information of the facial area,
    wherein determining a distance between the face and the image acquisition device as:

$$r = \min\left(\frac{T}{w \times h}, r0\right);$$

determining an angle between the face and the image acquisition device as:

$$\alpha = \left(1 - \frac{x + w/2}{W}\right) \times \pi;$$

where w and h indicate a width and a height of the rectangular area respectively, W indicates a width of the facial image, x indicates an abscissa of the lower left corner or the upper left corner of the rectangular area, r0 indicates the longest distance within which the image acquisition device performs facial recognition, and T indicates an inverse proportional coefficient.

2. The method according to claim 1, wherein the facial area is a rectangular area, and the position information of the facial area includes a vertex coordinate of the rectangular area and a width and a height of the rectangular area.

3. The method according to claim 1, wherein $$T = r0 \times s0$$

where s0 indicates a size of a facial rectangle box when the image acquisition device detects a face at a distance r0.

4. The method according to claim 1, further comprising:
    determining multiple pieces of corresponding spatial position information of the face according to multiple frames of facial image acquired by the image acquisition device; and linking the multiple pieces of spatial position information according to a chronological order to obtain a spatial motion trajectory of the face.

5. A face spatial positioning system, comprising a memory, a processor, and a computer program stored on the processor and running on the processor, wherein a face spatial positioning method are carried out when the processor executes the computer program, the facial spatial positioning method comprising:
   obtaining a facial image acquired by an image acquisition device;
   performing facial area detection on the facial image, to determine position information of a facial area in the facial image; and
   determining spatial position information of a face according to the position information of the facial area,
   wherein determining spatial position information of the face according to the position information of the facial area comprises:
   determining a distance and an angle between the face and the image acquisition device according to the position information of the facial area,
   wherein determining a distance between the face and the image acquisition device as:

$$r = \min\left(\frac{T}{w \times h}, r0\right);$$

determining an angle between the face and the image acquisition device as:

$$\alpha = \left(1 - \frac{x + w/2}{W}\right) \times \pi;$$

where w and h indicate a width and a height of the rectangular area respectively, W indicates a width of the facial image, x indicates an abscissa of the lower left corner or the upper left corner of the rectangular area, r0 indicates the longest distance within which the image acquisition device performs facial recognition, and T indicates an inverse proportional coefficient.

6. The face spatial positioning system according to claim 5, wherein the facial area is a rectangular area, and the position information of the facial area includes a vertex coordinate of the rectangular area and a width and a height of the rectangular area.

7. The face spatial positioning system according to claim 5, wherein $$T = r0 \times s0$$

where s0 indicates a size of a facial rectangle box when the single image acquisition device detects a face at a distance r0.

8. The face spatial positioning system according to claim 5, further comprising:
   determining multiple pieces of corresponding spatial position information of the face according to multiple frames of facial image acquired by the image acquisition device; and
   linking the multiple pieces of spatial position information according to a chronological order to obtain a spatial motion trajectory of the face.

9. A non-transitory recording medium on which a computer program is stored, wherein a face spatial positioning method is carried out when the computer program is executed by a processor, the facial spatial positioning method comprising:
   obtaining a facial image acquired by an image acquisition device;
   performing facial area detection on the facial image, to determine position information of a facial area in the facial image; and
   determining spatial position information of a face according to the position information of the facial area,
   wherein determining spatial position information of the face according to the position information of the facial area comprises:
   determining a distance and an angle between the face and the image acquisition device according to the position information of the facial area,
   wherein determining a distance between the face and the image acquisition device as:

$$r = \min\left(\frac{T}{w \times h}, r0\right);$$

determining an angle between the face and the image acquisition device as:

$$\alpha = \left(1 - \frac{x + w/2}{W}\right) \times \pi;$$

where w and h indicate a width and a height of the rectangular area respectively, W indicates a width of the facial image, x indicates an abscissa of the lower left corner or the upper left corner of the rectangular area, r0 indicates the longest distance within which the image acquisition device performs facial recognition, and T indicates an inverse proportional coefficient.

10. The non-transitory recording medium according to claim 9, wherein the facial area is a rectangular area, and the position information of the facial area includes a vertex coordinate of the rectangular area and a width and a height of the rectangular area.

11. The non-transitory recording medium according to claim 9, wherein $$T = r0 \times s0$$

where s0 indicates a size of a facial rectangle box when the image acquisition device detects a face at a distance r0.

12. The non-transitory recording medium according to claim 9, further comprising:
   determining multiple pieces of corresponding spatial position information of the face according to multiple frames of facial image acquired by the image acquisition device; and
   linking the multiple pieces of spatial position information according to a chronological order to obtain a spatial motion trajectory of the face.

* * * * *